United States Patent
Uchida et al.

(10) Patent No.: US 11,541,647 B2
(45) Date of Patent: Jan. 3, 2023

(54) WHITE POLYESTER FILM

(71) Applicant: Toray Industries, Inc., Tokyo (JP)

(72) Inventors: Hirohito Uchida, Otsu (JP); Takashi Isozaki, Otsu (JP); Yu Abe, Otsu (JP); Takashi Funatomi, Gifu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 10 days.

(21) Appl. No.: 17/054,214

(22) PCT Filed: Apr. 25, 2019

(86) PCT No.: PCT/JP2019/017684
§ 371 (c)(1),
(2) Date: Nov. 10, 2020

(87) PCT Pub. No.: WO2019/220918
PCT Pub. Date: Nov. 21, 2019

(65) Prior Publication Data
US 2021/0060914 A1    Mar. 4, 2021

(30) Foreign Application Priority Data
May 18, 2018  (JP) .............................. JP2018-095873

(51) Int. Cl.
| B32B 27/36 | (2006.01) |
| B32B 3/26 | (2006.01) |
| B32B 27/20 | (2006.01) |
| B32B 27/32 | (2006.01) |

(52) U.S. Cl.
CPC ................ B32B 27/36 (2013.01); B32B 3/26 (2013.01); B32B 27/20 (2013.01); B32B 27/32 (2013.01); *B32B 2250/03* (2013.01); *B32B 2264/1022* (2020.08); *B32B 2264/4021* (2020.08); *B32B 2270/00* (2013.01); *B32B 2307/4026* (2013.01); *B32B 2307/416* (2013.01); *B32B 2323/00* (2013.01); *B32B 2367/00* (2013.01); *B32B 2457/202* (2013.01); *B32B 2457/206* (2013.01)

(58) Field of Classification Search
None
See application file for complete search history.

(56) References Cited

U.S. PATENT DOCUMENTS

| 2009/0042016 A1 | 2/2009 | Yoshida et al. |
| 2012/0320600 A1 | 12/2012 | Ohira et al. |

FOREIGN PATENT DOCUMENTS

| CN | 101348602 A | | 1/2009 |
| CN | 104608446 A | | 5/2015 |
| JP | 02147641 A | | 6/1990 |
| JP | 0680798 A | | 3/1994 |
| JP | 06322153 A | * | 11/1994 |
| JP | 06322153 A | | 11/1994 |
| JP | 07118433 A | | 5/1995 |
| JP | 0816175 B2 | | 2/1996 |
| JP | 2003160682 A | | 6/2003 |
| JP | 3946183 B2 | | 7/2007 |
| JP | 2012135952 A | | 7/2012 |
| JP | 2013136232 A | | 7/2013 |
| JP | 2016147980 A | | 8/2016 |
| JP | 2018072498 A | | 5/2018 |
| WO | 2011105295 A1 | | 9/2011 |

OTHER PUBLICATIONS

Ito, K et al., Polyester Film, Nov. 22, 1994, machine translation of JP06-322153 (Year: 1994).*
International Search Report and Written Opinion for International Application No. PCT/JP2019/017684, dated Jun. 25, 2019, 12 pages.
Chinese Office Action for Chinese Application No. 201980024548.0, dated Apr. 19, 2022, with translation, 15 pages.

* cited by examiner

*Primary Examiner* — Chinessa T. Golden
(74) *Attorney, Agent, or Firm* — RatnerPrestia

(57) ABSTRACT

A white polyester film is described that includes at least a layer including, as a main component, a polyester resin (A), a thermoplastic resin (B) incompatible with the polyester resin (A), and an inorganic particle (C), where the white polyester film achieves high reflectance and a concealing property without increasing the thickness of the reflective film, the layer including voids in which the thermoplastic resin (B) functions as nuclei, wherein in a vertical section of the white film, NB2/NB1×100 (%) is 15% or more, wherein NB1 represents the number of the nuclei of the thermoplastic resin (B), and NB2 represents the number of the sections of the thermoplastic resin (B), the sections including the inorganic particle (C) inside.

18 Claims, No Drawings

WHITE POLYESTER FILM

CROSS REFERENCE TO RELATED APPLICATIONS

This is the U.S. National Phase application of PCT/JP2019/017684, filed Apr. 25, 2019, which claims priority to Japanese Patent Application No. 2018-095873, filed May 18, 2018, the disclosures of these applications being incorporated herein by reference in their entireties for all purposes.

FIELD OF THE INVENTION

The present invention relates to a white polyester film preferably used in thin liquid crystal displays.

BACKGROUND OF THE INVENTION

In recent years, many displays in which liquid crystal is used have been used as a display device for a personal computer, a television, a mobile phone, or the like. These liquid crystal displays are irradiated with light from the back side by providing a surface light source called backlight for the display operation. The backlight has a surface light source structure called edge light type or direct type in order to meet the requirement of uniform irradiation of the entire screen. Particularly for use in thin liquid crystal displays used in notebook computers that are desired to be slimmed and downsized, an edge light type backlight, that is, a backlight of a type in which a light source is provided at the side of a screen is applied.

In the edge light type backlight, a cold cathode ray tube or an LED is used as a light source, and light is uniformly propagated and diffused from the edge of the light-guiding plate to uniformly irradiate the entire liquid crystal display. In order to further efficiently utilize the light, a reflective film is provided around the light source, and in order to efficiently irradiate the liquid crystal screen side with the light diffused from the light-guiding plate, a reflective film is provided on the back face of the light-guiding plate. As a result, the loss of the light from the light source is reduced, and the function of brightening the liquid crystal screen is imparted.

As a reflective film used in such a backlight for a liquid crystal display, a film to which a white pigment is added or a film that includes fine air bubbles inside has been conventionally used singly or in a state that the film is adhered to a metal plate, a plastic plate, or the like. In particular, the film that includes fine air bubbles inside is widely used because it has an effect of improving the luminance and a certain effect of uniformizing the screen luminance (Patent Documents 1 and 2).

As mobile phones/smartphones and notebook computers are slimmed and downsized, and as the screen sizes of televisions are increased, a reflective film is required to have high reflectivity, a high light concealing property, and high rigidity despite the small thickness of the reflective film. In so-called 4K and 8K high-definition liquid crystal televisions, the transmittance of the liquid crystal panel tends to decrease, and higher reflectivity is particularly required.

In a reflective film, a configuration is widely employed in which reflection of light due to a difference in refractive index at the interface between the fine bubbles included in the film and the matrix resin is utilized. In order to increase the reflectivity, it is necessary to increase the number of interfaces. In order to increase the number of interfaces, formation of a void in which an inorganic particle having a relatively small particle size functions as a nucleus has been studied (Patent Documents 3 and 4).

However, if the number of interfaces is increased, the film-forming property is deteriorated, therefore, the reflective film needs to have a sufficient thickness, so that it is difficult to reduce the film thickness.

PRIOR ART DOCUMENTS

Patent Documents

Patent Document 1: Japanese Patent Laid-open Publication No. 2003-160682
Patent Document 2: Japanese Examined Patent Publication No. 8-16175
Patent Document 3: Japanese Patent No. 3946183
Patent Document 4: Japanese Patent Laid-open Publication No. 2013-136232

SUMMARY OF THE INVENTION

An object of the present invention is to solve the above-described problems and to provide a white film that achieves high reflectance and a concealing property with good film-forming stability without increasing the thickness of the reflective film.

As a result of intensive studies in view of the above-described problems, it has been found that the above-described problems can be solved by a film having the configuration described below, and the present invention has been made.

(1) A white film including at least a layer including, as a main component, a polyester resin (A), a thermoplastic resin (B) incompatible with the polyester resin (A), and an inorganic particle (C), the thermoplastic resin (B) forming a domain in the layer, wherein a formula (1) is satisfied wherein Bw represents a mass of a suspended insoluble matter generated by dissolving the white film in hexafluoroisopropanol and removing a precipitate, and Cbw represents a mass of an inorganic particle in the suspended insoluble matter.

$$0.01 < Cbw/(Bw-Cbw) < 1 \quad (1)$$

(2) A white film including at least a layer including, as a main component, a polyester resin (A), a thermoplastic resin (B) incompatible with the polyester resin (A), and an inorganic particle (C), the layer including voids in which the thermoplastic resin (B) functions as nuclei, wherein in a vertical section of the white film, the thermoplastic resin (B) has sections including the inorganic particle (C) inside, and NB2/NB1×100(%) is 15% or more wherein NB1 represents a number of the nuclei of the thermoplastic resin (B), and NB2 represents a number of the sections of the thermoplastic resin (B), the sections including the inorganic particle (C) inside.

(3) The white film according to (1) or (2), wherein the thermoplastic resin (B) is a polyolefin.

(4) The white film according to any one of (1) to (3), wherein the inorganic particle (C) includes titanium oxide as a main component.

(5) The white film according to any one of (1) to (4), wherein a ratio of a detection intensity of Si (silicon) to a detection intensity of M (a metal element of the main component of the inorganic particle), the ratio determined by SEM-EDX on a surface of the inorganic particle (C), satisfies a formula (2).

$$EDX(Si)/EDX(M) > 0.5 \quad \text{formula (2)}$$

(6) The white film according to any one of (1) to (5), wherein the inorganic particle (C) has an organic layer including silicon and having a thickness of 1 nm or more on the surface.

(7) The white film according to any one of (1) to (6), including at least three layers, wherein an inner layer includes, as a main component, the polyester resin (A), the thermoplastic resin (B) incompatible with the polyester resin (A), and the inorganic particle (C).

(8) The white film according to any one of (1) to (7), having a specific gravity of 0.6 or more and 1.0 or less.

(9) The white film according to any one of (1) to (8), used in an LED backlight.

(10) The white film according to any one of (1) to (8), used for lighting.

DETAILED DESCRIPTION OF EMBODIMENTS OF THE INVENTION

As a result of intensive studies on the problems, the present inventors have found that in order to obtain a reflective film having high reflectivity and a high light concealing property with good film-forming stability despite the small thickness of the reflective film, a configuration is important in which a void and a void nucleating agent are included, and the void nucleating agent includes an inorganic particle, and the present invention has been completed.

As a result of intensive studies, the present inventors have found that it is possible to provide a white film having high reflectivity and a high light concealing property with good film-forming stability despite the small thickness of the film in the case of a white film including at least a layer including, as a main component, a polyester resin (A), a thermoplastic resin (B) incompatible with the polyester resin (A), and an inorganic particle (C), the thermoplastic resin (B) forming a domain in the layer, wherein a formula (1) is satisfied wherein BW represents a mass of a suspended insoluble matter generated by dissolving the white film in hexafluoroisopropanol and removing a precipitate, and Cbw represents amass of an inorganic particle in the suspended insoluble matter, $$0.01 < Cbw/(Bw-Cbw) < 1 \quad (1)$$

or in the case of a white film including at least a layer including, as a main component, a polyester resin (A), a thermoplastic resin (B) incompatible with the polyester resin (A), and an inorganic particle (C), the layer including voids in which the thermoplastic resin (B) functions as nuclei, wherein in a vertical section of the white film, the thermoplastic resin (B) has sections including the inorganic particle (C) inside, and $NB2/NB1 \times 100(\%)$ is 15% or more wherein NB1 represents a number of the nuclei of the thermoplastic resin (B), and NB2 represents a number of the sections of the thermoplastic resin (B), the sections including the inorganic particle (C) inside.

The present invention will be described in detail below.
[Film Configuration]

The white film according to the present invention needs to include at least one layer including, as a main component, the polyester resin (A), the thermoplastic resin (B) incompatible with the polyester resin (A), and the inorganic particle (C). The content of the main component is required to be at least 50% by weight or more of the components included in a certain layer in a film.

Preferable aspects of the polyester resin (A) are described below. The term "polyester resin" refers to a polymer having an ester bond in the main chain, and the polyester resin used in the present invention preferably has a structure in which a dicarboxylic acid and a diol are subjected to polycondensation. Examples of the dicarboxylic acid component include aromatic dicarboxylic acids such as terephthalic acid, isophthalic acid, phthalic acid, 2,6-naphthalenedicarboxylic acid, diphenyldicarboxylic acid, diphenylsulfonedicarboxylic acid, diphenoxyethanedicarboxylic acid, and 5-sodium sulfone dicarboxylic acid, aliphatic dicarboxylic acids such as oxalic acid, succinic acid, adipic acid, sebacic acid, dimer acid, maleic acid, and fumaric acid, alicyclic dicarboxylic acids such as 1,4-cyclohexanedicarboxylic acid, and oxycarboxylic acids such as parahydroxybenzoic acid. Examples of the dicarboxylic acid ester derivative component include esterified products of the above-described dicarboxylic acid compounds, such as dimethyl terephthalate, diethyl terephthalate, 2-hydroxyethyl methyl terephthalate, dimethyl 2,6-naphthalenedicarboxylate, dimethyl isophthalate, dimethyl adipate, diethyl maleate, and dimethyl dimerate. Examples of the diol component include aliphatic dihydroxy compounds such as ethylene glycol, 1,2-propanediol, 1,3-propanediol, 1,3-butanediol, 1,4-butanediol, 1,5-pentanediol, 1,6-hexanediol, and 2,2-dimethyl-1,3-propanediol (neopentyl glycol), polyoxyalkylene glycols such as diethylene glycol, polyethylene glycol, polypropylene glycol, and polytetramethylene glycol, alicyclic dihydroxy compounds such as 1,4-cyclohexanedimethanol and spiro glycol, and aromatic dihydroxy compounds such as bisphenol A and bisphenol S. These components may be used singly or in combination of two or more kinds thereof. Furthermore, trimellitic acid, pyromellitic acid, and an ester derivative thereof may be copolymerized in small amount as long as the film-forming property of the film is not affected.

Specific examples of the polyester resin (A) include polyethylene terephthalate (hereinafter abbreviated as PET), polyethylene-2,6-naphthalene dicarboxylate, polypropylene terephthalate, polybutylene terephthalate, and poly-1,4-cyclohexylene dimethylene terephthalate, and they can be particularly suitably used because of the low costs and the good film-forming properties. The polyester resin (A) may be a homopolymer or a copolymer. Examples of the copolymerization component in the case of a copolymer include aromatic dicarboxylic acids, aliphatic dicarboxylic acids, alicyclic dicarboxylic acids, and diol components having 2 to 15 carbon atoms, such as isophthalic acid, adipic acid, sebacic acid, phthalic acid, sulfonic acid group-containing isophthalic acid, ester-forming compounds thereof, ethylene glycol, 1,4-butanediol, neopentyl glycol, 1,4-cyclohexanedimethanol, spiroglycol, and polyalkylene glycols having a number average molecular weight of 400 to 20,000.

The thermoplastic resin (B) incompatible with the polyester resin (A) is used as a void nucleating agent that forms voids described below. Specifically, a straight chain or branched chain olefin-based resin such as polyethylene, polypropylene, polybutene, or polymethylpentene, a cyclic olefin-based resin, a styrene-based resin, a poly(meth)acrylate resin, a polycarbonate resin, a polyacrylonitrile resin, a polyphenylene sulfide resin, a fluorine-based resin, or the like is selected. Among the above-described resins, the olefin-based resin and the styrene-based resin are preferable. As the olefin-based resin, polyethylene, polypropylene, poly(4-methylpentene-1) (hereinafter, sometimes abbreviated as "polymethylpentene" or "PMP"), ethylene-propylene copolymers, ethylene-butene-1 copolymers, and cyclic olefins are preferable. As the styrene-based resin, polystyrene, polymethylstyrene, polydimethylstyrene, and the like are preferable. These resins may be homopolymers or copolymers, and two or more thermoplastic resins (B) may be used in combination. The thermoplastic resin (B) according to the present invention is preferably a polyolefin. Specific examples of the polyolefin include straight chain or branched chain olefin-based resins such as polyethylene, polypropylene, polybutene, and polymethylpentene, and cyclic olefin-based resins, and polymethylpentene and cyclic olefins are particularly preferable. The polyolefin is preferable because with the polyolefin, voids are easily formed in the polyester resin (A), and at the same time, the film-forming property is easily obtained.

The polymethylpentene preferably used in the void nucleating agent preferably includes, as a repeating unit, a divalent organic group derived from 4-methylpentene-1 in the molecular skeleton at a content of 80 mol % or more, more preferably 85 mol % or more, and particularly preferably 90 mol % or more. Examples of another repeating unit include ethylene, propylene, butene-1,3-methylbutene-1, and divalent organic groups derived from a hydrocarbon having 6 to 12 carbon atoms other than 4-methylpentene-1. The polymethylpentene may be a homopolymer or a copolymer. Furthermore, a plurality of kinds of polymethylpentene having different compositions and different melt viscosities may be mixed and used, or the polymethylpentene, another olefin-based resin, and another resin may be used in combination.

The cyclic olefin preferably used in the void nucleating agent is a copolymer including a cycloolefin component such as a cycloalkene, a bicycloalkene, a tricycloalkene, or a tetracycloalkene, and a straight chain olefin component such as ethylene or propylene.

Typical examples of the cycloolefin component include bicyclo[2,2,1]hept-2-ene, 6-methylbicyclo[2,2,1]hept-2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-i-butylbicyclo[2,2,1]hept-2-ene, 7-methylbicyclo[2,2,1]hept-2-ene, tricyclo[4,3,0,$1^{2.5}$]-3-decene, 2-methyl-tricyclo[4,3,0,$1^{2.5}$]-3-decene, 5-methyl-tricyclo[4,3,0,$1^{2.5}$]-3-decene, tricyclo[4,4,0,$1^{2.5}$]-3-decene, and 10-methyl-tricyclo[4,4,0,$1^{2.5}$]-3-decene.

Typical examples of the straight chain olefin component include ethylene, propylene, 1-butene, 1-pentene, 1-hexene, 1-octene, 1-decene, 1-dodecene, 1-tetradecene, 1-hexadecene, and 1-octadecene.

The glass transition temperature (Tg) of the cycloolefin copolymer preferably used in the thermoplastic resin (B) (that mainly functions as a void nucleating agent) is preferably 110° C. or more. Both high reflectance and dimensional stability can be obtained because the glass transition temperature is 110° C. or more. Specifically, the glass transition temperature is preferably 130° C. or more, and more preferably 150° C. or more. This is because the cycloolefin copolymer having a glass transition temperature in such a range is finely dispersed in the resin during kneading to further reliably form voids in the stretching step and to suppress the disappearance of the voids in the heat treatment step. The upper limit of the glass transition temperature (Tg) of the cycloolefin copolymer is preferably 250° C.

In order to control the glass transition temperature (Tg) of the cycloolefin copolymer to 110° C. or more, for example, the content of the cycloolefin component in the cycloolefin copolymer is increased, and the content of the straight chain olefin component such as ethylene is reduced. Specifically, the content of the cycloolefin component is preferably 60 mol % or more, and the content of the straight chain olefin component such as ethylene is preferably less than 40 mol %. The content of the cycloolefin component is more preferably 70 mol % or more, and the content of the straight chain olefin component such as ethylene is more preferably less than 30 mol %. The content of the cycloolefin component is still more preferably 80 mol % or more, and the content of the straight chain olefin component such as ethylene is still more preferably less than 20 mol %. The content of the cycloolefin component is particularly preferably 90 mol % or more, and the content of the straight chain olefin component such as ethylene is particularly preferably less than 10 mol %. By setting the contents in such ranges, the glass transition temperature (Tg) of the cycloolefin copolymer can be raised to the above-described range.

In the case that the cycloolefin copolymer is used, the straight chain olefin component is preferably an ethylene component from the viewpoint of reactivity. The cycloolefin component is preferably bicyclo[2,2,1]hept-2-ene (norbornene) or its derivative from the viewpoints of productivity, transparency, and raising Tg.

From the viewpoint of reflectance, the thermoplastic resin (B) (that mainly functions as a void nucleating agent) is preferably included at a content of 5 to 50% by mass based on 100% by mass of the layer including, as a main component, the polyester resin (A), the thermoplastic resin (B), and the inorganic particle (C). The content is more preferably 10 to 40% by mass. If the content is less than 5% by mass, the number of voids formed is small, and the reflectance is sometimes low. If the content is more than 50% by mass, the reflectance is easily reduced, the film is easily broken during the film formation, and the productivity is sometimes reduced.

In the white film according to present invention, the inorganic particle (C) preferably includes titanium oxide as a main component. The reflectance is easily improved because titanium oxide is included as a main component. The content of titanium oxide is required to be at least 50% by mass or more of the components included in the inorganic particle (C) so that titanium oxide is a main component.

The average particle size (D50, mode average particle size) of the inorganic particle (C) is preferably 0.05 to 1 μm. The average particle size is more preferably 0.1 to 0.5 μm, and still more preferably 0.15 to 0.35 μm. If the average particle size is less than 0.05 μm, the dispersibility tends to decrease and aggregation tends to occur, and if the average particle size is more than 1 μm, a structure described below in which the inorganic particle (C) is included in the thermoplastic resin (B) is sometimes not obtained, therefore, such an average particle size is not preferable.

The content of the inorganic particle (C) is preferably more than 10% by mass and less than 40% by mass in the layer including, as a main component, the polyester resin (A), the thermoplastic resin (B), and the inorganic particle (C). The content is more preferably more than 15% by mass and less than 35% by mass. In the case that the content is less than 10% by mass, the reflectance is sometimes reduced, therefore, such a content is not preferable. In the case that the content is more than 40% by mass, the productivity is sometimes deteriorated, therefore, such a content is not preferable. In particular, the thinner the film thickness is, the more easily the productivity is deteriorated.

In the white film according to the present invention, the layer including, as a main component, the polyester resin (A), the thermoplastic resin (B) incompatible with the polyester resin (A), and the inorganic particle (C) needs to include voids in which the thermoplastic resin (B) functions as nuclei.

The term "void" in the present invention refers to a space that is formed with a void nucleating agent and present in the layer. The shape of the void is a substantially circle or a substantially ellipse as observed at the section of the film. The void can be formed by a method in which the above-described polyester resin (A) and the void nucleating agent are mixed at an arbitrary ratio to prepare a resin, an external force is applied to the resin by stretching the resin, and the void nucleating agent is peeled off the polyester resin (A). Specific examples of the method include a method in which a mixture including the polyester resin (A) and the void nucleating agent is melt-extruded and then stretched in at least one direction to form bubbles inside.

In the white film according to the present invention, the formula (1) needs to be satisfied wherein Bw represents a mass of a suspended insoluble matter generated by dissolving the white film in hexafluoroisopropanol and removing a precipitate, and Cbw represents a mass of an inorganic particle in the suspended insoluble matter.

$$0.01 < Cbw/(Bw-Cbw) < 1 \tag{1}$$

The insoluble matter generated by dissolving the white film in hexafluoroisopropanol is divided into a precipitate and a suspended insoluble matter, and the suspended insoluble matter mainly includes the thermoplastic resin (B) having a density smaller than that of hexafluoroisopropanol (1.6 g/cm$^3$). The suspended insoluble matter is collected and dried, and its mass is represented by Bw. The mass of the inorganic particle included in the suspended insoluble matter is measured by, for example, ICP analysis, and is represented by Cbw. The larger the ratio of Cbw to the mass of the components other than the inorganic particle in the suspended insoluble matter (Bw−Cbw), Cbw/(Bw−Cbw) is, the more the inorganic particle (C) is included inside the thermoplastic resin (B). The inorganic particle (C) is preferably included inside the thermoplastic resin (B) because both film-forming stability and an optical property can be obtained in such a case. It is more preferable that 0.02<Cbw/(Bw−Cbw)<0.7, and it is still more preferable that 0.03<Cbw/(Bw−Cbw)<0.5. If Cbw/(Bw−Cbw) is 0.01 or less, it is difficult to obtain both film-forming stability and good optical properties (reflectance and transmittance). If the ratio is 1 or more, inorganic particles tend to aggregate, therefore, such a ratio is not preferable. In the case that the collected precipitate also includes the thermoplastic resin (B), a liquid having a higher specific gravity, such as an aqueous solution of sodium bromide, may be used, or the precipitate may be collected through separation by centrifugation.

In the white film according to the present invention, when observed in a vertical section of the white film, the thermoplastic resin (B) has sections including the inorganic particle (C) inside, and a ratio NB2/NB1×100(%) needs to be 15% or more wherein NB1 represents a number of the nuclei of the thermoplastic resin (B), and NB2 represents a number of the sections of the thermoplastic resin (B), the sections including the inorganic particle (C) inside. The ratio is more preferably 20% or more, and more preferably 30% or more. A void nucleating agent portion is conventionally transparent and makes no direct contribution to the improvement of the reflectance. However, in the case that the thermoplastic resin (B) includes the inorganic particle (C), the void nucleating agent reflects light to improve the reflection efficiency, so that the reflectance can be enhanced even in a thin film. In the case that the ratio of NB2 is less than 15%, the reflectance is sometimes not sufficiently improved, therefore, such a ratio is not preferable. Furthermore, the inorganic particle (C) present in the thermoplastic resin (B) rarely promotes the crystallization of the polyester resin (A). In the case that the white film is produced by biaxial stretching as described below, the film-forming stability is easily deteriorated when crystallization is promoted. The white film having high reflectance can be obtained with good film-forming stability because the inorganic particle (C) is present in the thermoplastic resin (B). The inorganic particle (C) may be partially present in the polyester resin (A) as long as the inorganic particle (C) is present in the thermoplastic resin (B).

An example of a method of obtaining a vertical section of the white film according to the present invention will be shown. Using an ion milling device, the film is cut perpendicularly to the film surface and parallel to the length direction of the film without crushing the film in the thickness direction to prepare a measurement sample. In the same manner, the film is cut perpendicularly to the film surface and parallel to the width direction of the film to prepare a vertical section as a measurement sample. Then, the cut face of the sample in each of the length direction and the width direction is observed using a scanning electron microscope (FE-SEM), and an image magnified and observed by 10,000 times is obtained. The observation range is 100 μm×100 μm. Note that the part to be observed is arbitrarily determined in the layer including, as a main component, the polyester resin (A), the thermoplastic resin (B), and the inorganic particle (C). In the case that the thickness of the layer is less than 100 μm, the observation range is the entire layer in the thickness direction, and 100 μm in the direction parallel to the film surface. From the obtained image, the number of domains of the thermoplastic resin (B) that are the nuclei of the voids and appear in the section, NB1 is counted. At this time, domains that do not appear in the section are excluded even if they are visible behind the voids.

Among the domains of the thermoplastic resin (B) present in the voids, the number of domains in which the inorganic particle (C) appears in the section, NB2 is counted. Domains having the inorganic particle included inside the domain are counted, and domains having the inorganic particle attached only to the surface of the domain are not counted.

As a method of incorporating the inorganic particle (C) into the thermoplastic resin (B), surface treatment of the inorganic particle (C) for increasing the compatibility with the thermoplastic resin (B) is preferable. As the surface treatment agent, silicone, a silane coupling agent, an aluminum chelating agent, polyurea, or the like is preferably used. A silane coupling agent is particularly preferable.

The surface treatment method is not particularly limited, and examples thereof include a dry method and a wet method. The dry method is a method in which a surface treatment agent is dropped or sprayed into an inorganic material being stirred at a high speed by a stirrer to cause a reaction, and the wet method is a method in which an organic solvent such as an alcohol is added to an inorganic material to prepare slurry, and a surface treatment agent is added to the slurry to cause a reaction.

For example, in the case of treatment with a silane coupling agent, a method is preferably used in which the inorganic particle (C) is surface-treated with the silane coupling agent in advance in accordance with an ordinary method and then melt-kneaded with the thermoplastic resin (B). Furthermore, an integral blend method can be used in which a coupling agent is added when the inorganic particle (C) is melt-kneaded with the thermoplastic resin (B) without surface treatment of the inorganic particle (C) in advance.

A masterbatch prepared by melt-kneading the inorganic particle (C) with the thermoplastic resin (B) is further melt-kneaded with a resin such as the polyester resin (A), and the melt-kneaded mixture is formed into a sheet to obtain a structure in which the inorganic particle (C) is included inside the thermoplastic resin (B).

In the white film according to the present invention, a ratio of a detection intensity of Si (silicon) to a detection intensity of M (a metal element of the main component of the inorganic particle), the ratio determined by SEM-EDX (energy dispersive X-ray analysis) on a surface of the inorganic particle (C), preferably satisfies a formula (2).

$$EDX(Si)/EDX(M)>0.5 \quad \text{formula (2)}$$

It can be said that the higher the detection intensity of silicon to the detection intensity of the metal element, the more sufficiently the surface of the inorganic particle is coated with the compound containing silicon. The detection intensity ratio is more preferably more than 0.6, and still more preferably more than 0.7. It is preferable that the surface of the inorganic particle be sufficiently coated with the compound containing silicon because the compatibility between the inorganic particle (C) and the thermoplastic resin (B) is easily increased in such a case. In the case that the detection intensity ratio is 0.5 or less, the compatibility between the inorganic particle (C) and the thermoplastic resin (B) is sometimes deteriorated, therefore, such a ratio is not preferable.

In the white film according to the present invention, the inorganic particle (C) preferably has an organic layer including silicon and having a thickness of 1 nm or more on the surface. The thickness is more preferably 1.5 nm or more, and still more preferably 2 nm or more. In the case that the thickness of the organic layer including silicon is more than 10 nm, the reflectance of the inorganic particle (C) is sometimes reduced, therefore, such a thickness is not preferable.

It is preferable that the white film according to the present invention include at least three layers, and a core layer include, as a main component, the polyester resin (A), the thermoplastic resin (B) incompatible with the polyester resin (A), and the inorganic particle (C). For example, a configuration in which a core layer (Y) and surface layers (X) are stacked in three layers in the order of X/Y/X is preferable. By stacking the surface layers (X) and the core layer (Y) in the order of X/Y/X, high film-forming stability can be sometimes obtained. The white film according to the present invention may have a configuration of four or more layers, but a three-layer configuration is preferable in consideration of the ease and the strength in film formation. The surface layers (X) and the core layer (Y) are preferably stacked at once in a film forming line by a co-extrusion method and then stretched in two axial directions. Furthermore, if necessary, re-longitudinal stretching and/or re-lateral stretching may be performed.

The white film according to the present invention preferably has a specific gravity of 0.6 or more and 1.0 or less. The specific gravity is more preferably 0.7 or more and 0.85 or less. In the case that the specific gravity is less than 0.6, the ratio of voids in the film is high, and the productivity is sometimes deteriorated, therefore, such a specific gravity is not preferable. In the case that the specific gravity is more than 1.0, the void formation is insufficient, and the reflectance is sometimes reduced, therefore, such a specific gravity is not preferable. In order to set the specific gravity in the preferable range, it is preferable to add the thermoplastic resin (B) that functions as a void nucleating agent and the inorganic particle (C) in amounts described above.

An inorganic particle (D) different from the inorganic particle (C) may be included as long as an effect of the present invention is not impaired. The inorganic particle (D) may function as a void nucleating agent. The average particle size (D50, mode average particle size) of the inorganic particle (D) is preferably 0.05 to 1 μm. The average particle size is more preferably 0.1 to 0.5 μm, and still more preferably 0.15 to 0.35 μm. If the average particle size is less than 0.05 μm, the dispersibility tends to decrease and aggregation tends to occur, and if the average particle size is more than 1 μm, the voids is easily connected to each other and the productivity is sometimes deteriorated.

In the case that the inorganic particle (D) is included, the content of the inorganic particle (D) is preferably 1 to 40% by mass in the layer including, as a main component, the polyester resin (A), the thermoplastic resin (B), and the inorganic particle (C). The content is more preferably 5 to 30% by mass, and still more preferably 10 to 25% by mass. In the case that the content is less than 1% by mass, a sufficient effect is sometimes not obtained, therefore, such a content is not preferable. In the case that the content is more than 40% by mass, the productivity is sometimes deteriorated, therefore, such a content is not preferable. If the content of the inorganic particle (D) is increased, the reflectance and the transmittance is improved, but the film-forming stability is deteriorated.

Furthermore, the total content of the inorganic particle (C) and the inorganic particle (D) is preferably less than 50% by mass in the layer including, as a main component, the polyester resin (A), the thermoplastic resin (B), and the inorganic particle (C). In the case that the total content of the inorganic particle (C) and the inorganic particle (D) is 50% by mass or more, the productivity is sometimes deteriorated, therefore, such a content is not preferable. The total content of the inorganic particle (C) and the inorganic particle (D) is more preferably 10 to 40% by mass, and still more preferably 15 to 35% by mass.

The inorganic particle (D) is selected from silica, colloidal silica, calcium carbonate, aluminum silicate, calcium phosphate, alumina, magnesium carbonate, zinc carbonate, zinc oxide, antimony oxide, cerium oxide, zirconium oxide, tin oxide, lanthanum oxide, magnesium oxide, barium carbonate, basic lead carbonate (lead white), barium sulfate, calcium sulfate, lead sulfate, zinc sulfide, mica, mica titanium, talc, clay, or kaolin. The above-described inorganic particles can be used singly or in combination of two or more, and among them, a silica particle, a barium sulfate particle, a calcium carbonate particle, and a zinc oxide particle are particularly preferable because a high optical property and film-forming stability can be obtained.

Next, an example of the method for producing the white film according to the present invention will be described, but the method is not particularly limited. In a composite film-forming apparatus including at least two single-screw or twin-screw extruders, that is, a main extruder and a sub-extruder, a resin being a raw material of the core layer (Y) is charged in the main extruder, and a resin being a raw material of the surface layers (X) is charged in the sub-extruder. Each raw material is preferably dried so as to have a moisture content of 50 ppm or less. Thus, the raw materials are supplied to the respective extruders, and for example, with the two extruders and a feed block or a multi-manifold installed on the upper portion of a T die, an X/Y/X three-layer laminated film can be obtained. The extruded unstretched sheet is cooled and solidified in a close contact state on a cooled drum to obtain an unstretched laminated film. At this time, in order to obtain a uniform film, it is desirable to put the extruded unstretched sheet into close contact with the drum by application of static electricity. Then, if necessary, a stretching process and a heat treatment process are performed to obtain a target polyester film.

The unstretched film is heated by roll heating, or if necessary, heated by infrared heating or the like to a temperature equal to or more than the glass transition temperature (Tg) of the polymer, and stretched in the length direction (hereinafter referred to as the longitudinal direction) to obtain a longitudinally stretched film. The unstretched film is stretched by utilizing the circumferential speed difference in two or more rolls. The rate of the longitudinal stretching is preferably 2 to 6 times, and more preferably 3 to 4 times, although depending on the required property of the application. If the factor is less than 2 times, the reflectance is sometimes low, and if the factor is more than 6 times, breakage is sometimes caused easily during film formation. While the longitudinally stretched film is run, the film is subsequently subjected to processes of stretching, heat setting, and heat relaxation sequentially in the direction orthogonal to the longitudinal direction (hereinafter referred to as the lateral direction) to obtain a biaxially oriented film. At this time, it is preferable to perform the preheating and the stretching, for the lateral stretching, at a temperature equal to or more than the glass transition temperature (Tg) of the polymer (Tg+20° C.). The rate of the lateral stretching is preferably 2.5 to 6 times, and more preferably 3 to 4 times, although depending on the required property of the application. If the factor is less than 2.5 times, the reflectance is sometimes low. If the factor is more than 6 times, breakage is sometimes caused easily during film formation. In order to complete the crystal orientation of the obtained biaxially stretched laminated film to impart planarity and dimensional stability, the film is subsequently subjected to heat treatment in a tenter at a temperature of 180 to 230° C. for 1 to 60 seconds, uniformly cooled gradually, then cooled to room temperature, and wound up on a roll. Such heat treatment may be performed while the film is relaxed in its length direction and/or width direction by 3 to 12%.

Although the case of stretching by the sequential biaxial stretching method has been described in detail here as an example, the polyester film according to the present invention may be stretched by either of a sequential biaxial stretching method or a simultaneous biaxial stretching method, and furthermore, if necessary, re-longitudinal stretching and/or re-lateral stretching may be performed after the biaxial stretching.

In order to impart planar stability and dimensional stability to the biaxially stretched laminated film thus obtained, the film is subsequently subjected to heat treatment (heat setting) in a tenter, uniformly cooled gradually, then cooled to about room temperature, and then wound up to obtain the white film according to the present invention.

In addition, to at least one surface of the resin layer (A), various coating liquids may be applied using known techniques in order to impart slipperiness, an antistatic property, ultraviolet light absorption performance, and the like, or a hard coat layer or the like may be provided in order to improve impact resistance as long as an effect of the present invention is not impaired. The coating may be applied during film production (in-line coating) or may be applied to a white film after film production (off-line coating).

The thickness of the white film in the present invention is preferably 30 μm or more and 300 μm or less, and more preferably 50 μm or more and 200 μm or less. The thickness is still more preferably 50 μm or more and 140 μm or less. In the case that the thickness is less than 30 μm, the film-forming property is deteriorated, and sufficient reflectivity is not obtained, therefore, such a thickness is not preferable. In the case that the thickness is more than 300 μm, it is impossible to meet the demand for thinning a liquid crystal display, therefore, such a thickness is not preferable. The thickness of a light reflective film can be adjusted by a known method such as adjusting the melt extrusion amount of the resin from the extruder and the speed of the step of stretching the unstretched sheet.

EXAMPLES

Hereinafter, the present invention will be described in detail with reference to Examples. Each characteristic value was measured by the following method.

(1) Bw, Cbw

One gram of the white film was weighed, 100 ml of HFIP was added, and the mixture was sufficiently stirred to dissolve the white film. The mixture was allowed to stand, then the suspended insoluble matter was collected and dried, and the weight of the dried matter was represented by Bw. The dried matter was decomposed by heating with sulfuric acid, nitric acid, perchloric acid, and hydrofluoric acid, and then dissolved by heating with dilute nitric acid to a constant volume. The metal element in this solution was measured by ICP emission spectroscopy to determine the content in the sample, and the value in terms of the oxide was represented by Cbw.

(2) Glass Transition Temperature

Using a differential scanning calorimeter (manufactured by Seiko Instruments & Electronics, RDC220), measurement and analysis were performed in accordance with JIS K7121-1987 and JIS K7122-1987. Using 5 mg of the polyester layer or the polyester film as a sample, the specific heat change that was based on the transition from the glass state to the rubber state and obtained from the DSC curve of the temperature rise from 25° C. to 300° C. at 20° C./min was read, and the midpoint glass transition temperature was determined, as a glass transition temperature, at the intersection of the straight line that is equidistant along the vertical axis (axis showing heat flow) from the extended straight line of each baseline and the curve of the stepwise change part of the glass transition. Note that the endothermic peak having an extremely small peak area (0.5 J/g or less in terms of crystal melting energy) found on the baseline was excluded as noise. In the case that only the surface layer was measured, the surface layer was cut out with a cutter for measurement.

(3) Section SEM, NB1, NB2

Using an ion milling device Hitachi IM4000, the film was cut perpendicularly to the film surface and parallel to the length direction of the film without crushing the film in the thickness direction to prepare a measurement sample. In the same manner, the film was cut perpendicularly to the film surface and parallel to the width direction of the film to prepare a measurement sample. In the case that the length direction of the film is unknown, the film is cut in an arbitrary direction and in the direction perpendicular to the arbitrary direction. Then, the cut face of the sample in each of the length direction and the width direction was observed using a scanning electron microscope (a field emission scanning electron microscope (FE-SEM) S-4000 manufactured by Hitachi, Ltd.), and an image magnified and observed by 10,000 times was obtained. In each cut face, an area of 100 μm×100 μm is observed, and the number of domains of the thermoplastic resin (B) that function as the nuclei of the voids and appear in the section, NB1 is counted. At this time, domains that do not appear in the section are excluded even if they are visible behind the voids.

Among the domains of the thermoplastic resin (B) present in the voids, the number of domains in which the inorganic particle appears in the section, NB2 is counted. Domains having the inorganic particle included inside the domain are counted, and domains having the inorganic particle attached only to the surface of the domain are not counted.

(4) SEM-EDX, EDX Intensity

The sample was magnified 25,000 times at the time of the SEM observation of the section, and analysis was performed using an attached energy dispersive X-ray detector (EDX EMAX-7000, manufactured by HORIBA, Ltd.). Total 30 inorganic particles (C), 15 of which were in the section in the length direction, and 15 of which were in the section in the width direction, that were visible in the sections of the domains of the thermoplastic resin (B) were selected, and the EDX intensity was evaluated on Ba, Ti, Ca, and Zn at the central portion of each of the selected inorganic particles (C). The element having the highest average intensity of 30 portions is regarded as the main metal element of the inorganic particle (C). In the same manner, the intensity of the Si element was evaluated. EDX(Si)/EDX(M) was evaluated for 10 particles ranked in descending order by the intensity of the Si element from first to tenth, and the average was regarded as the EDX intensity ratio of the present application.

(5) Average Particle Size of Inorganic Particle (D50, Mode Average Particle Size)

The SEM image of the section cut parallel to the film width direction was imported into the image processing software "PerfectView7", 100 inorganic particles in the measurement visual field were converted into a perfect circle, the diameters of the circles were calculated, a histogram of the diameters was generated, and the particle size at which the integrated value was 50% was regarded as the average particle size of the inorganic particle. In the case that a plurality of kinds of inorganic particles are present, they are identified by EDX or the like, and the average particle size of each inorganic particle is determined.

(6) Surface Treatment Thickness

The film was embedded in an epoxy resin and cut out with a microtome (manufactured by Leica Microsystems: RM2265) perpendicular to the film surface and parallel to the length direction of the film. Using a scanning transmission electron microscope (STEM) JEM2100F (with an annular dark field detector) manufactured by JEOL Ltd., the surface treatment thickness of the inorganic particle (C) visible in the section of the thermoplastic resin (B) domain was observed. Five or more inorganic particles (C) were observed, and the average thickness was regarded as the surface treatment thickness.

Observation method: high-angle annular dark-field method (HAADF method)

Measurement condition: accelerating voltage 100 to 200 kV

Measurement magnification: 200,000 times

Detection angle: 75 mrad

Accelerating voltage: 30 to 40 KeV

Here, the HAADF image is obtained by an imaging method, also called the Z-contrast method, that uses only elastically scattered electrons scattered proportionally to the approximate square of the atomic number. The thickness of each layer is calculated from the HAADF-STEM image contrast.

(7) Reflectance

A spectrophotometer (U-3310) manufactured by Hitachi High-Technologies Corporation is equipped with a 60 mmϕ integrating sphere, and the reflectance is measured based on 100% of the reflectance of a standard white plate of aluminum oxide (manufactured by Hitachi High-Technologies Corporation, Part No. 210-0740) over 400 to 700 nm. The reflectances are read from the obtained chart at 5 nm intervals, and the arithmetic average value is calculated as the reflectance.

A: 100% or more
B: 99% or more and less than 100%
C: 98% or more and less than 99%
D: 97% or more and less than 98%
E: less than 97%

(8) Transmittance (Total Light Transmittance)

Using a turbidity meter "NDH5000" manufactured by NIPPON DENSHOKU INDUSTRIES CO., LTD., the total light transmittance was measured in accordance with JIS "Plastics-Determination of the total luminous transmittance of transparent materials" (K7361-1, 1997 version).

A: less than 2.5%
B: 2.5% or more and less than 3.0%
C: 3.0% or more and less than 3.5%
D: 3.5% or more and less than 4.0%
E: 4.0% or more (9) Film Thickness Five sections of the film were cut out at the central portion in the width direction and photographed by observing with a scanning electron microscope (field emission scanning electron microscope (FE-SEM)S-4000 manufactured by Hitachi, Ltd.) at a magnification of 500 to 5,000 times, and the thickness of the film was measured from the micrograph of the section. The average of the thickness values from the 5 micrographs was regarded as the film thickness.

(10) Specific Gravity of Film

The obtained film was cut into a size of 5 cm×5 cm and measured using an electronic densimeter SD-120L (manufactured by Mirage Trading Co., Ltd.) in accordance with JIS K7112 (1980 version). Five samples were prepared for each film and measured, and the average of the specific gravity values of the five samples was regarded as the specific gravity of each film.

(11) Film-Forming Stability

The film was formed for 48 hours, and the number of times the film broke every 12 hours was determined.

A: less than once
B: 1 time or more and less than 2 times
C: 2 times or more and less than 3 times
D: 3 times or more
E: Film formation is impossible.

(12) Overall Evaluation

The evaluation of reflectance, transmittance, or film-forming stability (A to E) is converted into a score such as A: 5 points, B: 4 points, C: 3 points, D: 2 points, or E: 1 point. When the total of scores of the three evaluations were 10 points or more, the film was accepted.

[Used Raw Material]

(1) Polyester Resin (a)

Terephthalic acid and ethylene glycol were polymerized by an ordinary method using antimony trioxide as a catalyst to obtain polyethylene terephthalate (PET). The obtained PET had a glass transition temperature of 77° C., a melting point of 255° C., an intrinsic viscosity of 0.63 dl/g, and a concentration of the terminal carboxyl group of 40 eq./t.

(2) Copolymerized Polyester Resin (b)

A commercially available 1,4-cyclohexanedimethanol copolymerized polyester (GN001 manufactured by Eastman Chemical Company) was used.

(3) Copolymerized Polyester Resin (c)

A commercially available PBT-PAG (polyalkylene glycol) copolymer "Hytrel 7247" (manufactured by DU PONT-TORAY CO., LTD.) was used. The resin is a block copolymer of PBT (polybutylene terephthalate) and PAG (mainly, polytetramethylene glycol).

(4) Thermoplastic Resin (d)

A commercially available cyclic olefin resin "TOPAS 6017" (manufactured by POLYPLASTICS CO., LTD.) was used.

(5) Titanium Dioxide Master (e)

To 50 parts by mass of a titanium dioxide particle (number average particle size: 0.25 μm), 0.025 parts by mass of a silane coupling agent "11-100 Additive" (manufactured by Dow Corning Toray Co., Ltd.) was added, surface treatment was performed by an ordinary method, and then the resulting product was kneaded with 50 parts by weight of the polyester resin (a) by a twin-screw extruder to obtain a titanium dioxide master pellet (e).

(6) Titanium Dioxide Master (f)

By a twin-screw extruder, 50 parts by weight of the thermoplastic resin (d) and 50 parts by weight of a titanium dioxide particle (number average particle size: 0.25 μm) were kneaded to obtain a titanium dioxide master pellet (f).

(7) Titanium Dioxide Master (g)

To 50 parts by mass of a titanium dioxide particle (number average particle size: 0.25 μm), 0.25 parts by mass of a silane coupling agent "11-100 Additive" (manufactured by Dow Corning Toray Co., Ltd.) was added, surface treatment was performed by an ordinary method, and then the resulting product was kneaded with 50 parts by weight of the thermoplastic resin (d) by a twin-screw extruder to obtain a titanium dioxide master pellet (g)

(8) Titanium Dioxide Master (h)

To 50 parts by mass of a titanium dioxide particle (number average particle size: 0.25 μm), 0.025 parts by mass of a silane coupling agent "11-100 Additive" (manufactured by Dow Corning Toray Co., Ltd.) was added, surface treatment was performed by an ordinary method, and then the resulting product was kneaded with 50 parts by weight of the thermoplastic resin (d) by a twin-screw extruder to obtain a titanium dioxide master pellet (h).

(9) Barium Sulfate Master (i)

By a twin-screw extruder, 50 parts by mass of a barium sulfate particle (number average particle size: 0.5 μm) and 50 parts by weight of the polyester resin (A) were kneaded to obtain a barium sulfate master pellet (i).

(10) Calcium Carbonate Master (j)

By a twin-screw extruder, 50 parts by mass of a calcium carbonate particle (number average particle size: 0.5 μm) and 50 parts by weight of the polyester resin (A) were kneaded to obtain a calcium carbonate master pellet (j).

(11) Thermoplastic Resin (k)

A commercially available polymethylpentene resin ("TPX" manufactured by Mitsui Chemicals, Inc.) was used.

(12) Titanium Dioxide Master (l)

To 50 parts by mass of a titanium dioxide particle (number average particle size: 0.25 μm), 0.25 parts by mass of a silane coupling agent "11-100 Additive" (manufactured by Dow Corning Toray Co., Ltd.) was added, surface treatment was performed by an ordinary method, and then the resulting product was kneaded with 50 parts by weight of the thermoplastic resin (k) by a twin-screw extruder to obtain a titanium dioxide master pellet (l).

Examples 1 to 11 and Comparative Examples 1 to 3

After the raw materials having the compositions shown in Table 1 were vacuum-dried at a temperature of 180° C. for 6 hours, the raw material of the core layer (Y) was supplied to a main extruder, melt-extruded at a temperature of 280° C., and then filtered with a 30 μm cut filter. The raw material of the surface layers (X) was supplied to a sub-extruder, melt-extruded at a temperature of 290° C., and then filtered with a 30 μm cut filter. Then, the surface layers (X) were combined so as to be stacked on both surfaces of the core layer (Y) (X/Y/X) in a T die composite spinneret.

Then, the resulting product was extruded into a molten sheet, and the molten sheet was cooled and solidified in a close contact state on a drum having a maintained surface temperature of 25° C. by an electrostatic application method to obtain an unstretched film. Subsequently, the unstretched film was preheated by a roll group heated to a temperature of 80° C. Then, while irradiated with an infrared heater from both sides, the film was stretched in the length direction (longitudinal direction) at a rate shown in Table 2 and cooled by a roll group at a temperature of 25° C. to obtain a uniaxially stretched film. Then, while both the ends of the uniaxially stretched film were held with clips, the uniaxially stretched film was guided to a preheating zone at 110° C. in a tenter and subsequently stretched in the direction perpendicular to the length direction (lateral direction) at a rate shown in Table 2 at 120° C. Subsequently, the film was heat-treated at a temperature shown in Table 2 in a heat treatment zone in the tenter, uniformly cooled gradually, and then wound up on a roll to obtain a white film having a thickness shown in Table 2.

Comparative Example 4

After the raw materials having the compositions shown in Table 1 were vacuum-dried at a temperature of 180° C. for 6 hours, the raw material of the core layer (Y) was supplied to a main extruder, melt-extruded at a temperature of 280° C., and then filtered with a 30 μm cut filter. The raw material of the surface layers (X) was supplied to a sub-extruder, melt-extruded at a temperature of 290° C., and then filtered with a 30 μm cut filter. Then, the surface layers (X) were combined so as to be stacked on both surfaces of the core layer (Y) (X/Y/X) in a T die composite spinneret.

Then, the resulting product was extruded into a molten sheet, and the molten sheet was cooled and solidified in a close contact state on a drum having a maintained surface temperature of 25° C. by an electrostatic application method to obtain an unstretched film. Subsequently, the unstretched film was preheated by a roll group heated to a temperature of 80° C. Then, while irradiated with an infrared heater from both sides, the film was stretched in the length direction (longitudinal direction) at a rate shown in Table 2 and cooled by a roll group at a temperature of 25° C. to obtain a uniaxially stretched film. Then, while both the ends of the uniaxially stretched film were held with clips, the uniaxially stretched film was guided to a preheating zone at 110° C. in a tenter and subsequently stretched in the direction perpendicular to the length direction (lateral direction) at a rate shown in Table 2 at 120° C. However, the film frequently broke, and no film to be evaluated was collected.

TABLE 1

| | Configuration | \multicolumn{14}{c|}{Core layer (Y)} |
| | | Resin | Content (% by Weight) | Resin | Content (% by Weight) | Resin | Content (% by Weight) | Resin | Content (% by Weight) | Resin | Content (% by Weight) | Resin | Content (% by Weight) | Resin | Content (% by Weight) |
|---|---|---|---|---|---|---|---|---|---|---|---|---|---|---|---|
| Example 1 | X/Y/X | (a) | 100 | (a) | 50 | (b) | 5 | (c) | 5 | (g) | 20 | (e) | 20 | | |
| Example 2 | X/Y/X | (a) | 100 | (a) | 30 | (b) | 5 | (c) | 5 | (g) | 20 | (e) | 40 | | |
| Example 3 | X/Y/X | (a) | 100 | (a) | 40 | (b) | 5 | (c) | 5 | (g) | 20 | (e) | 20 | (d) | 10 |
| Example 4 | X/Y/X | (a) | 100 | (a) | 30 | (b) | 5 | (c) | 5 | (g) | 40 | (e) | 20 | | |
| Example 5 | X/Y/X | (a) | 100 | (a) | 50 | (b) | 5 | (c) | 5 | (h) | 20 | (e) | 20 | | |
| Example 6 | X/Y/X | (a) | 100 | (a) | 50 | (b) | 5 | (c) | 5 | (g) | 10 | (e) | 30 | | |
| Example 7 | X/Y/X | (a) | 100 | (a) | 30 | (b) | 5 | (c) | 5 | (g) | 20 | (i) | 40 | | |
| Example 8 | X/Y/X | (a) | 100 | (a) | 30 | (b) | 5 | (c) | 5 | (g) | 20 | (j) | 40 | | |
| Example 9 | X/Y/X | (a) | 100 | (a) | 50 | (b) | 5 | (c) | 5 | (g) | 20 | (l) | 20 | | |
| Example 10 | X/Y/X | (a) | 100 | (a) | 30 | (b) | 5 | (c) | 5 | (g) | 30 | (e) | 30 | | |
| Example 11 | X/Y/X | (a) | 100 | (a) | 50 | (b) | 5 | (c) | 5 | (g) | 20 | (e) | 20 | | |
| Comparative Example 1 | X/Y/X | (a) | 100 | (a) | 60 | (b) | 5 | (c) | 5 | (d) | 10 | (e) | 20 | | |
| Comparative Example 2 | X/Y/X | (a) | 100 | (a) | 40 | (b) | 5 | (c) | 5 | (d) | 10 | (e) | 40 | | |
| Comparative Example 3 | X/Y/X | (a) | 100 | (a) | 50 | (b) | 5 | (c) | 5 | (f) | 20 | (e) | 20 | | |
| Comparative Example 4 | X/Y/X | (a) | 100 | (a) | 0 | (b) | 5 | (c) | 5 | (g) | 20 | (e) | 70 | | |

TABLE 2

| | Film forming conditions | | | | | | | | | | |
| | Longitudinal stretching rate Time | Longitudinal stretching rate Time | Heat treatment °C. | Thickness μ | Specific gravity | Cbw/(Bw-Cbw) | NB2/NB1 × 100 % | Surface treatment thickness nm | EDX(Si)/EDX(M) | Reflectance % | Transmittance % |
|---|---|---|---|---|---|---|---|---|---|---|---|
| Example 1 | 3.3 | 3.3 | 200 | 100 | 0.75 | 0.15 | 28 | 2 | 0.65 | 98.1 | 3.4 |
| Example 2 | 3.3 | 3.3 | 200 | 100 | 0.77 | 0.25 | 30 | 2 | 0.64 | 99.3 | 2.5 |
| Example 3 | 3.3 | 3.3 | 200 | 100 | 0.65 | 0.18 | 32 | 2 | 0.63 | 100.7 | 3.2 |
| Example 4 | 3.3 | 3.3 | 200 | 100 | 0.67 | 0.38 | 29 | 2 | 0.65 | 101.8 | 1.5 |
| Example 5 | 3.3 | 3.3 | 200 | 100 | 0.74 | 0.03 | 16 | 0.2 | 0.37 | 97.5 | 3.3 |
| Example 6 | 3.3 | 3.3 | 200 | 100 | 0.81 | 0.09 | 29 | 2 | 0.62 | 97.1 | 3.1 |
| Example 7 | 3.3 | 3.3 | 200 | 100 | 0.79 | 0.25 | 30 | 2 | 0.64 | 98.9 | 2.8 |
| Example 8 | 3.3 | 3.3 | 200 | 100 | 0.74 | 0.26 | 30 | 2 | 0.64 | 98.8 | 3 |
| Example 9 | 3.3 | 3.3 | 200 | 100 | 0.72 | 0.14 | 19 | 2 | 0.65 | 97.8 | 3.4 |
| Example 10 | 3.3 | 3.3 | 200 | 100 | 0.73 | 0.31 | 30 | 2 | 0.64 | 101.4 | 1.9 |
| Example 11 | 3 | 3 | 200 | 100 | 0.88 | 0.15 | 28 | 2 | 0.65 | 97.5 | 3.8 |
| Comparative Example 1 | 3.3 | 3.3 | 200 | 100 | 0.72 | 0 | 0 | 0 | — | 95.8 | 4.1 |
| Comparative Example 2 | 3.3 | 3.3 | 200 | 100 | 0.74 | 0 | 0 | 0 | — | 97.2 | 3 |
| Comparative Example 3 | 3.3 | 3.3 | 200 | 100 | 0.75 | 0 | 0 | 0 | — | 97.4 | 3.1 |
| Comparative Example 4 | 3.3 | 3.3 | 200 | 100 | — | — | — | 2 | — | — | — |

TABLE 3

| | \multicolumn{4}{c|}{Evaluation} |
| | Reflectance | Transmittance | Film-forming stability | Overall |
|---|---|---|---|---|
| Example 1 | C | C | A | 11 |
| Example 2 | B | A | C | 12 |
| Example 3 | A | C | B | 12 |
| Example 4 | A | A | C | 13 |
| Example 5 | D | C | A | 10 |
| Example 6 | D | C | A | 10 |
| Example 7 | C | B | C | 10 |
| Example 8 | C | C | B | 10 |
| Example 9 | C | C | B | 10 |
| Example 10 | A | A | B | 14 |
| Example 11 | D | C | A | 10 |
| Comparative Example 1 | E | E | A | 7 |
| Comparative Example 2 | D | C | C | 8 |
| Comparative Example 3 | D | C | C | 8 |
| Comparative Example 4 | — | — | E | — |

INDUSTRIAL APPLICABILITY

According to the present invention, it is possible to provide a white film that achieves high reflectance and a concealing property with good film-forming stability without increasing the thickness of the reflective film.

The invention claimed is:

1. A white film comprising at least a layer including, as a main component, a polyester resin (A), a thermoplastic resin (B) incompatible with the polyester resin (A), and an inorganic particle (C),
the thermoplastic resin (B) forming a domain in the layer,
wherein a formula (1) is satisfied wherein Bw represents a mass of a suspended insoluble matter generated by dissolving the white film in hexafluoroisopropanol and removing a precipitate, and Cbw represents a mass of an inorganic particle in the suspended insoluble matter $$0.01 < Cbw/(Bw-Cbw) < 1 \qquad (1).$$

2. The white film according to claim 1, wherein the thermoplastic resin (B) is a polyolefin.

3. The white film according to claim 1, wherein the inorganic particle (C) includes titanium oxide as a main component.

4. The white film according to claim 1, wherein a ratio of a detection intensity of Si (silicon) to a detection intensity of M (a metal element of the main component of the inorganic particle), the ratio determined by SEM-EDX on a surface of the inorganic particle (C), satisfies a formula (2)

$$EDX(Si)/EDX(M) > 0.5 \qquad \text{formula (2)}.$$

5. The white film according to claim 1, wherein the inorganic particle (C) has an organic layer including silicon and having a thickness of 1 nm or more on the surface.

6. The white film according to claim 1, including at least three layers, wherein an inner layer includes, as a main component, the polyester resin (A), the thermoplastic resin (B) incompatible with the polyester resin (A), and the inorganic particle (C).

7. The white film according to claim 1, having a specific gravity of 0.6 or more and 1.0 or less.

8. The white film according to claim 1, used in an LED backlight.

9. The white film according to claim 1, used for lighting.

10. A white film comprising at least a layer including, as a main component, a polyester resin (A), a thermoplastic resin (B) incompatible with the polyester resin (A), and an inorganic particle (C),
the layer including voids in which the thermoplastic resin (B) functions as nuclei,
wherein in a vertical section of the white film,
the thermoplastic resin (B) has sections including the inorganic particle (C) inside, and NB2/NB1×100(%) is 15% or more wherein NB1 represents a number of the nuclei of the thermoplastic resin (B), and NB2 represents a number of the sections of the thermoplastic resin (B), the sections including the inorganic particle (C) inside.

11. The white film according to claim 10, wherein the thermoplastic resin (B) is a polyolefin.

12. The white film according to claim 10, wherein the inorganic particle (C) includes titanium oxide as a main component.

13. The white film according to claim 10, wherein a ratio of a detection intensity of Si (silicon) to a detection intensity of M (a metal element of the main component of the inorganic particle), the ratio determined by SEM-EDX on a surface of the inorganic particle (C), satisfies a formula (2)

$$EDX(Si)/EDX(M) > 0.5 \qquad \text{formula (2)}.$$

14. The white film according to claim 10, wherein the inorganic particle (C) has an organic layer including silicon and having a thickness of 1 nm or more on the surface.

15. The white film according to claim 10, including at least three layers, wherein an inner layer includes, as a main component, the polyester resin (A), the thermoplastic resin (B) incompatible with the polyester resin (A), and the inorganic particle (C).

16. The white film according to claim 10, having a specific gravity of 0.6 or more and 1.0 or less.

17. The white film according to claim 10, used in an LED backlight.

18. The white film according to claim 10, used for lighting.

* * * * *